(12) United States Patent
Hartrich (10) Patent No.: US 7,431,606 B2
(45) Date of Patent: Oct. 7, 2008

(54) POWER CORD CONNECTION AND STRAIN RELIEF DEVICE

(75) Inventor: Michael McLaughlin Hartrich, Santa Cruz, CA (US)

(73) Assignee: Michael Hartrich, Santa Cruz, CA (US)

( * ) Notice: Subject to any disclaimer, the term of this patent is extended or adjusted under 35 U.S.C. 154(b) by 769 days.

(21) Appl. No.: 10/894,516

(22) Filed: Jul. 20, 2004

(65) Prior Publication Data
US 2005/0075003 A1 Apr. 7, 2005

Related U.S. Application Data

(60) Provisional application No. 60/488,911, filed on Jul. 21, 2003.

(51) Int. Cl.
H01R 13/62 (2006.01)
(52) U.S. Cl. ..................................................... 439/369
(58) Field of Classification Search ......... 439/368–371, 439/453, 445
See application file for complete search history.

(56) References Cited

U.S. PATENT DOCUMENTS

| | | | |
|---|---|---|---|
| 2,732,531 A | | 1/1956 | Janowiec |
| 2,761,109 A | | 8/1956 | Hacker |
| 3,383,639 A | | 5/1968 | Anderson |
| 3,512,223 A | * | 5/1970 | Willinger ................ 403/209 |
| 3,781,761 A | * | 12/1973 | Harwood ................ 439/369 |
| 3,922,055 A | * | 11/1975 | McGregor ............... 439/369 |
| 4,184,732 A | * | 1/1980 | Hudson ................... 439/369 |
| 4,664,463 A | | 5/1987 | Carmo |
| 4,719,668 A | * | 1/1988 | Cavanagh ................ 24/68 F |
| 4,773,874 A | * | 9/1988 | Kopeski, Jr. ............. 439/369 |
| 4,832,618 A | | 5/1989 | Gunderson |
| 5,129,836 A | | 7/1992 | Ursich |
| 5,129,839 A | | 7/1992 | VanSkiver |
| 5,514,004 A | | 5/1996 | Swanson |
| 5,582,524 A | | 12/1996 | Sanner et al. |
| 5,893,772 A | | 4/1999 | Carmo et al. |
| 6,094,783 A | * | 8/2000 | Parsons .................. 24/130 |

OTHER PUBLICATIONS

'Twist-Lock' Word Mark IC 009. VS 021. G & S: Serial No. 71581484 Filing Date: Jul. 2, 1949.

* cited by examiner

*Primary Examiner*—Alexander Gilman (57) ABSTRACT

A power cord connection device that reinforces the plug-to-plug connection between two power cords. The shaped main body of the invention is fitted with an attachment rope that is fastened behind the plug of a primary power cord. A secondary power cord is plugged in and makes a wide loop between the end of the main body and the plug-to-plug connection, while the attachment rope is taut under direct tension over the same distance. The secondary power cord is then looped through the openings and over the friction ridges of the main body. Any strain upon the primary power cord now bypasses the plug-to-plug connection in favor of the attachment rope. The invention also transfers the hanging weight of an extension cord to a ladder. The invention also keeps a power cord organized for storage.

5 Claims, 6 Drawing Sheets

POWER CORD CONNECTION AND STRAIN RELIEF DEVICE

This application claims the benefit of PPA 60/488,911 filed on Jul. 21, 2003 by present inventor

BACKGROUND OF THE INVENTION

1. Field of the Invention

This invention relates to cord connectors that reinforce the plug-to-plug connection between power cords and, more particularly, to a cord connector that may be used additionally to transfer the weight of the power cord to a ladder, and also may be used to keep the power cord organized in a coiled configuration for storage.

2. Background of the Invention

The discovery of electricity was followed by a subsequent invention of numerous power tools. The invention of electrical extension cords allowed workers to extend their use of power tools over a distance. The transfer of electrical power from the extension cord to the power tool, or to another extension cord, occurs via the plug-to-plug connection. This connection has to remain intact in order for the power tool to work. Unfortunately, the standard plug-to-plug connection simply is not designed to resist the amount of wear and tear often encountered in work. Dragging the power cord around a job site, or a back yard for that matter, generates a strain force upon the cord. When the strain force exceeds the frictional holding power of the plug-to-plug connection, the plugs come apart. The plug-to-plug connection is the weak link in the chain of power transmission. It is really annoying to be working with a power tool and to suddenly have the tool shut down because the plug got disconnected. This happens very often, as any trades person can attest to.

BACKGROUND OF THE INVENTION—OTHER SOLUTIONS

Over the years a number of inventors have attempted to tackle this problem. Basically, all prior art solutions may be roughly grouped into one of three major types.

1. The first type of solution seeks to reinforce the plug-to-plug connection by increasing the frictional holding power between the male and female prongs. The idea behind this is that a strong friction force upon the metal prongs will resist the separating force of strain. One of the earliest examples of this solution is described in U.S. Pat. No. 2,732,531 issued to JANOWIEC in 1956. Here four tension screws act as friction generators upon the prongs. It is takes time to tighten all four screws, and that time factor reduces its usefulness on a job site, where many different power tools may be successively plugged into one extension cord. U.S. Pat. Nos. 5,129,836 issued to URSICH in 1992 and Pat. No. 5,893,772 issued to CARMO ET AL. in 1999 improve upon this design. Both of these use a single spring-loaded tension-release mechanism. This works much faster, but the extra frictional force generated thereby to reinforce the plug-to-plug connection is limited to the resistance of the spring in the mechanism. This is not a very strong reinforcing mechanism.

The most universal and successful example of this type of cord connector solution is the 'TWIST-LOCK' locking plug that is commonly used on many commercial construction sites in the USA. The popular use of this type of locking plug has made the term 'TWIST-LOCK' a generally accepted descriptive term. The disadvantage to the 'TWIST-LOCK' locking plug is that you need to rig up all your power tools and extension cords with matching male and female 'TWIST-LOCK' plugs. This makes it difficult to switch to tools or cords with standard plugs.

2. The second type of solution is based upon enclosing the plug-to-plug connection within a shaped housing that restricts the tendency of the plugs to separate under strain. U.S. Pat. No. 2,761,109 issued to HACKER in 1956 and Pat. No. 3,383,639 issued to ANDERSON ET AL. in 1968 both require the use of a manually set wing-nut type locking mechanism. This is time consuming. U.S. Pat. No. 4,664,463 issued to CARMO in 1987 requires the manual working of a housed tensioning cylinder, which is awkward. It also does not account for the different sizes of plugs, especially the wide replacement plugs that are often used to repair broken plugs. U.S. Pat. No. 4,832,618 issued to GUNDERSON in 1989 has no moving parts and appears to be easy to use. However, it also does not accommodate the full range of plug sizes. U.S. Pat. No. 5,129,839 issued to VANSKIVER in 1992 is made of two halves comprising one full, complete enclosure around the plug-to-plug connection. This may be advantageous to guard against rain or water intrusion, but each half has no positive connection to the power cord unless both halves are fully engaged. What happens when the plugs are disconnected? This device may easily be misplaced or lost when not in actual use.

3. The third type of solution completely bypasses the plug components of the connection. It works by generating friction directly to a point or section of the cord element of each power cord. U.S. Pat. No. 3,781,761 issued to HARWOOD in 1973 is large, clumsy and unwieldy. U.S. Pat. No. 5,582,524 issued to SANNER ET AL. in 1996 provides for a very tight turning radius to hold the power cord. This is bad for the power cord. U.S. Pat. No. 3,992,055 issued to McGREGOR in 1975 utilizes a series of S-shaped bends to hold the power cords. This will work well. However, this invention is awkward and clumsy when it is not in actual use. It is long and does not fit into a tool belt due to its length. It would be difficult to use in a situation where many power tools were successively plugged into the same extension cord. U.S. Pat. No. 5,514,004 issued to SWANSON in 1996 has a similar configuration and is subject to the same limitations. It also becomes a clumsy weight at the end of the extension cord when not in use.

Finally, there is one very simple, unpatented method used by many people to reinforce the plug-to-plug connection between two power cords. You simply use the power cords themselves to tie a simple loop knot around the area of the plugs. This unpatented method is fast, cheap and works well enough. This method tends to strain the power cord right behind the plug end, but its advantages still make it the uncrowned 'king of connectors'.

To summarize, all the cord connectors heretofore known suffer from a number of disadvantages:

A: Most of the known invented cord connectors simply take too much time to put into operation effectively. This is a real problem when many power tools are successively plugged into one extension cord. This is the reason for the enduring popularity of the unpatented loop-knot solution.

B: The shape of the some cord connectors is bulky and intrusive.

C: The means of attaching the cord connector permanently to a primary power cord is either non-existent, unreliable or awkward.

D: Some cord connectors force the power cords into tight radius configurations that may harm the cords.

E: The reinforcing power is not strong enough if applied solely to the prongs of the plugs.

F: Some of these cord connectors only work with standard plugs. Their shape does not allow for application with larger plugs or replacement plugs.
G: Some cord connectors only work with a limited range of medium sized power cords.
H: None of the known cord connectors are designed for use in other applications.

Their utility is strictly limited to reinforcing the plug-to-plug connection.

BACKGROUND OF INVENTION—OBJECTS AND ADVANTAGES

Accordingly, several objects and advantages of my invention are:
A: to provide a fast and simple way to reinforce the plug-to-plug connection between two power cords. My cord connector takes less time to apply than the loop-knot application.
B: The shape of my cord connector is simple, elegant, aesthetically pleasing, functional and non-intrusive.
C: My cord connector is permanently mounted to a primary power cord via its attachment rope. Once this has been cinched down in place behind the plug, the connector is ready for use. When not in use the connector hangs off its mounted location. The main body of the cord connector may easily be looped on to the cord of the primary power cord to keep it from moving around needlessly when not in use as intended.
E: My cord connector generates enough holding power to suspend a 15-pound power tool in the air. This is more than adequate for most job site requirements.
F: My cord connector works with any size of plug sized for cord gauges 10-18.
G: My cord connector is designed to work with the power cord sizes most commonly used with power tools; from 10-gauge through 18-gauge.
H: My cord connector has additional applications. It makes ladder work with power tools and extension cords much easier and it may be used to keep extension cords coiled up and organized after use.

Still further objects and advantages will become apparent from a consideration of the ensuing description and drawings.

SUMMARY

DESCRIPTION OF INVENTION

In accordance with the present invention there is provided a cord connector that reinforces the plug-to-plug connection between two power cords, and also transfers the weight of a power cord to a ladder, and also helps to maintain a rolled up power cord in a coiled shape for storage.

The serpentine shaped main body of the invention has an integral attachment rope by which it is fastened to a primary power cord behind the plug. A secondary power cord is plugged into the primary power cord, and is looped through the openings and over the friction ridges of the main body. The secondary power cord makes a wide loop between the end of the main body and the plug-to-plug connection, while the attachment rope is direct and tautly under tension over the same distance. Any strain that would normally act to separate the plug-to-plug connection is now transferred via the attachment rope to the primary power cord behind the plug.

This invention secures an extension cord to a ladder rung, thereby transferring the gravitational weight of the extension cord to the ladder.

This invention works to keep power cords organized when they are rolled up.

OBJECT OF THE INVENTION

It is therefore an object of the invention to reinforce the plug-to-plug connection between power cords.

It is another object of the invention to make ladder work with power tools easier by transferring the weight of the hanging power cord to the ladder.

It is another object of the invention to keep a power cord in an organized rolled-up configuration when not in use.

LIST OF REFERENCE NUMERALS

| | |
|---|---|
| 10 Power Cord Connection Device | |
| 12 main body | 14 shaped end opening |
| 16 shaped middle opening | 18 friction ridge |
| 20 attachment rope | 22 end point |
| 24 hole | 26 dual-opening part |
| 28 end loop | 30 end cap |
| 32 primary power cord | 32 primary power cord plug |
| 36 secondary power cord | 38 secondary power cord plug |
| 40 decorative logo | 42 decorative wording |
| 44 ladder | 46 ladder rung |
| 48 rolled up power cord | 50 fastener |
| 52 wall | |

DETAILED DESCRIPTION OF THE PREFERRED EMBODIMENT

Figure 1:
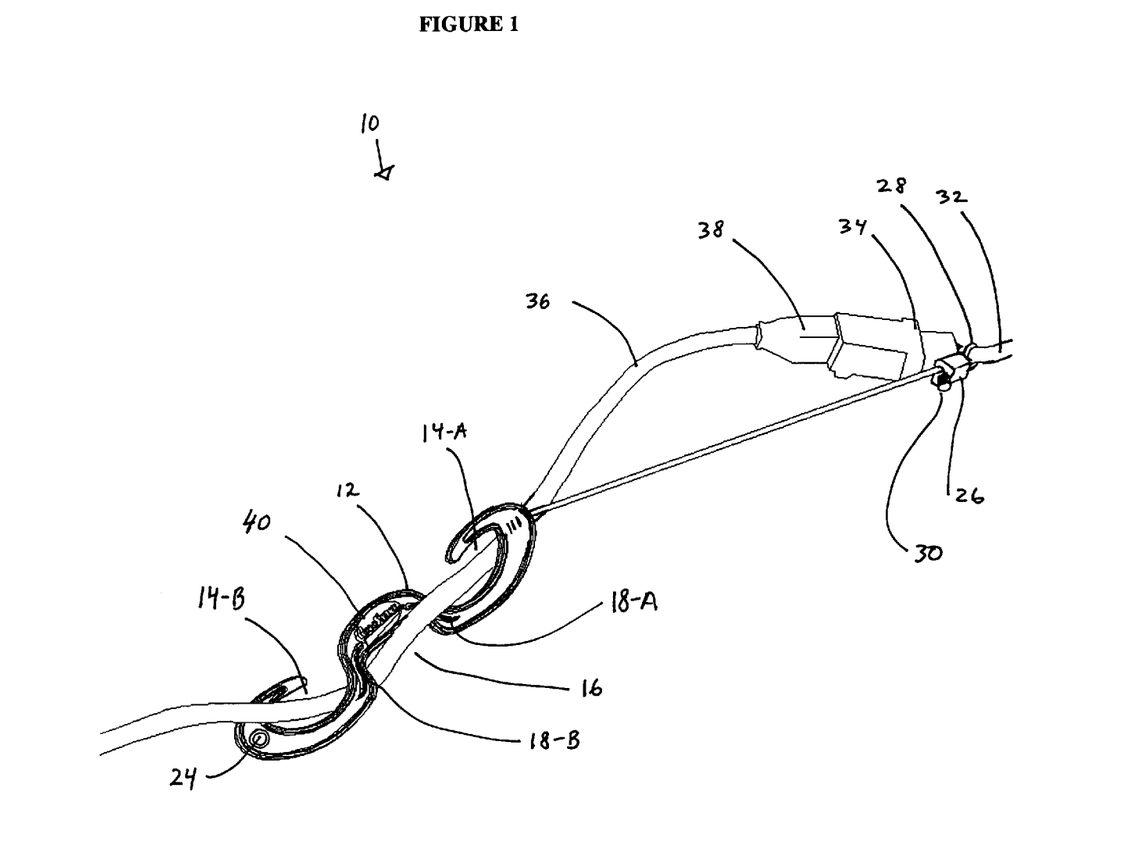
FIG. 1 is a perspective view of the cord connector in accordance with the invention as a means of reinforcing the plug-to-plug connection between two power cords.

FIG. 1

FIG. 1 is a perspective view of the preferred embodiment of power cord connection device 10 in accordance with the invention as a means of reinforcing the plug-to-plug connection between two power cords.

In the preferred embodiment, main body 12 is fabricated out of plastic. However main body 12 may consist of any other suitable material that does not conduct electricity. Main body 12 has a flat serpentine shape with shaped end openings 14 and shaped middle opening 16. These openings are sized to accommodate power cord sizes 10-gauge through 18-gauge, which are commonly used with power tools. There is friction ridge 18 on each side of shaped middle opening 16.

Attachment rope 20 is solidly connected to main body 12 at end point 22. In the preferred embodiment attachment rope 20 is a non-elastic 3/16" diameter nylon cord that is rated to hold 300 pounds of dead weight, and is integrally fused to main body 12 during the injection-plastic manufacturing process.

Alternately, other non-elastic rope-like material may be used, such as web strapping, and other means of attachment of the rope to the main body may be used. Alternately, there is hole 24 to which attachment rope 20 may be manually connected. The overall length of attachment rope 20 in the preferred embodiment ranges between 9 and 15 inches.

Attachment rope 20 has a dual-opening part 26 slidingly connected. The preferred embodiment of dual-opening part 26 is a small rectangular part made of plastic, which has two parallel openings within it for passage of attachment rope 20. An alternate embodiment of dual-opening part 26 can also include a mechanism to adjust and regulate the length of attachment rope 20 between dual-opening part 26 and end point 22, such as a buckle or clasp. The end of attachment 20 passes through one opening of dual-opening part 26 in one direction and then returns by the opposite direction through the other opening in dual-opening part 26, thereby creating end loop 28. The end of attachment 20 is capped with end cap 30, which prevents attachment 20 from being pulled back out of dual-opening part 26. End cap 30 also finishes the end of attachment rope 20, giving it a clean and professional appearance. In the preferred embodiment end cap 30 is made of plastic and is glued or fused to the end of attachment rope 20. Additionally end cap 30 may be reinforced with a simple loop knot tied directly in front of it and in front of dual-opening part 26.

End loop 28 is passed over primary power cord plug 34 and then cinched down onto primary power cord 32 directly behind primary power cord plug 34. This operation permanently attaches power cord connection device 10 to primary power cord 32.

Alternately, main body 12 may be looped on to primary power cord 32 to keep it out of the way when power cord connection device 10 is not in use as intended. Secondary power cord 36 is plugged into primary power cord plug 34 via secondary power cord plug 38. Secondary power cord 36 is then successively looped through shaped end opening 14-A, shaped middle opening 16, shaped end opening 14-B and simultaneously traverses friction ridge 18-A and friction ridge 18-B. Each shaped end opening 14 is designed to allow secondary power cord 36 to enter its enclosure and to then hold it in place, simultaneously preventing it from slipping out of position. In most cases secondary power cord 36 is looped through all three openings in the body.

However, in the case of a large diameter power cord, e.g. a 10-gauge sized power cord, such a power cord only passes through shaped end openings 14 while passing over shaped middle opening 16. The passage of secondary power cord 36 through shaped end openings 14 creates friction, which acts to resist the further movement of secondary power cord 36 through main body 12. Friction ridge 18 on either side of shaped middle opening 16 extends in height beyond the surface plane of main body 12. It thereby creates an elevated ridge over which secondary power cord 36 must pass as it is looped through the openings. This adds to the friction maintaining the static connection between main body 12 and secondary power cord 36.

Attachment 20 is direct and tautly in tension between end 22 and cinched-down end loop 28, while secondary power cord 36 makes a wide loop over the same distance. The length of attachment 20 must be shorter than the length of secondary power cord 36 over this distance for the invention to work. Any strain placed upon secondary power cord 36 during its use is now transferred via main body 12 via end point 22 to attachment 20 to primary power cord plug 34 via cinched-down end loop 28, and thus effectively bypasses the plug-to-plug connection.

Decorative logo 40 and decorative wording 42 are inscribed upon main body 12.

Figure 2:
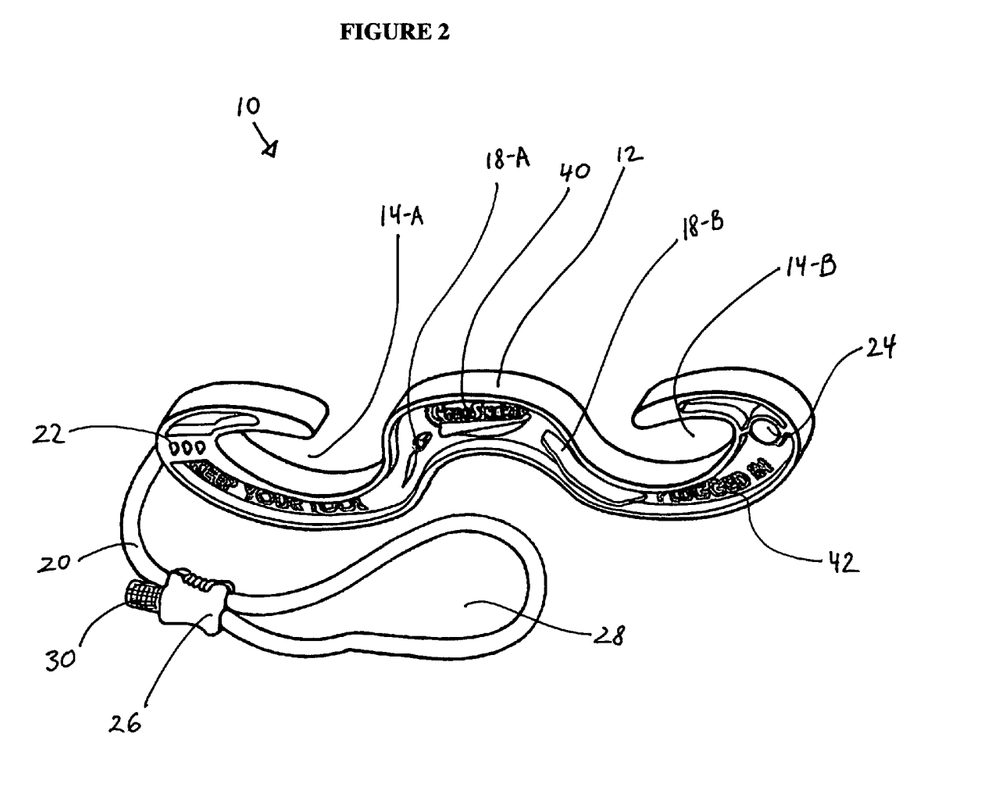
FIG. 2 is a perspective view of the cord connector in itself.

FIG. 2

FIG. 2 is a perspective of power cord connection device 10 by itself. Main body 12 is flat and serpentine-shaped. Main body 12 contains shaped end opening 14-A, shaped middle opening 16, and shaped end opening 14-B. Friction ridge 18 is placed upon either side of shaped middle opening 16, as well as on both sides, front and back, of main body 12. Attachment 20 is integrally connected to main body 12 at end point 22.

Alternately, the attachment rope may be passed through hole 24 and then secured with a knot, or other such fastening mechanism. Dual-opening part 26 allows for the creation of end loop 28 at the end of attachment rope 20. End cap 30 finishes the end of attachment rope 20 and prevents the withdrawal of attachment 20 back through dual-opening part 26. Alternately or in conjunction with end cap 30, a simple loop knot may be tied into attachment cord 20 prior to end cap 30 in order to prevent the end of cord 20 from being pulled back through dual-opening part 26, which would undo end loop 28.

Main body 12 is inscribed with decorative logo 40 and decorative wording 42.

Figure 3:
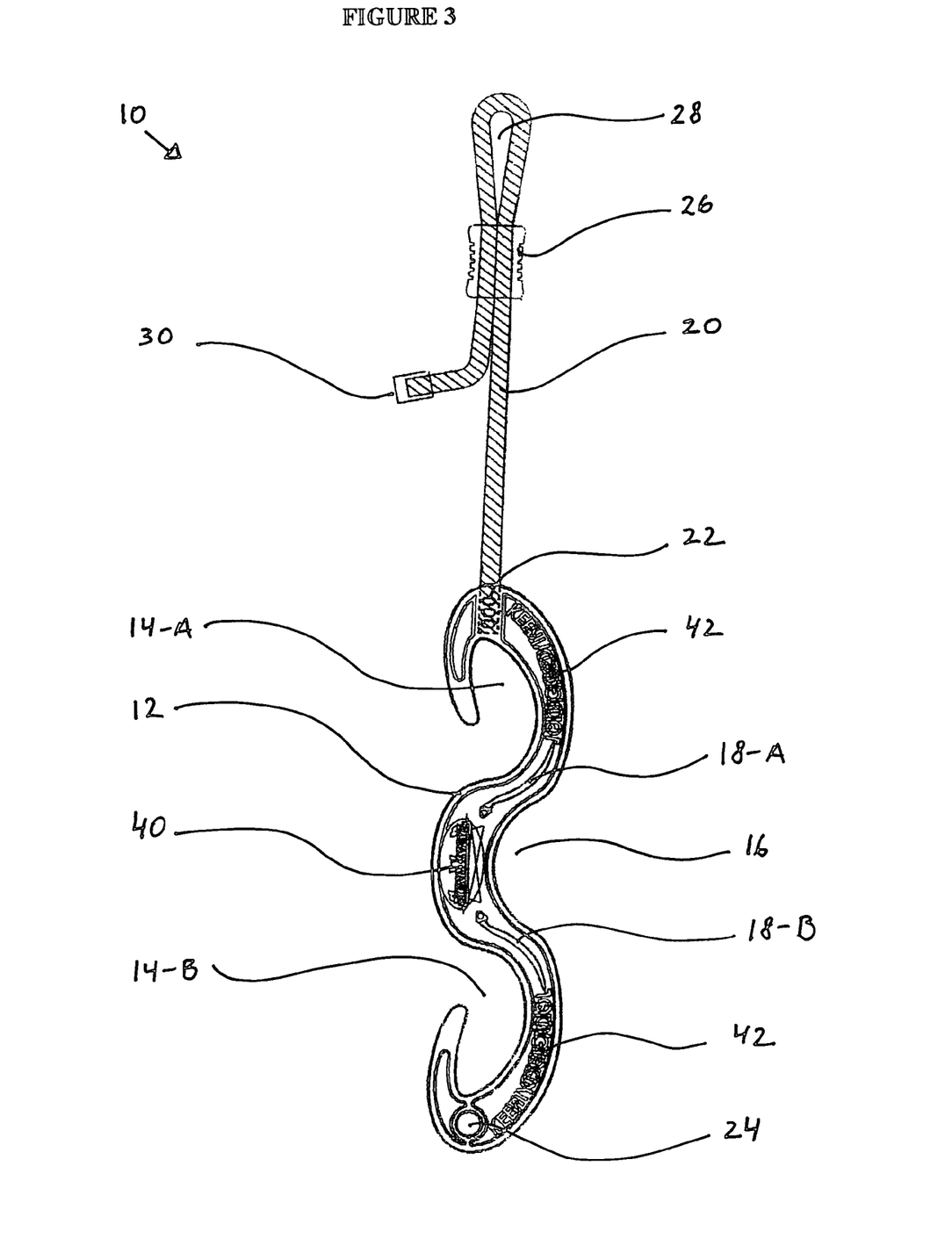
FIG. 3 is a front view of the cord connector.

FIG. 3

FIG. 2 is a perspective of power cord connection device 10 by itself. Main body 12 is flat and serpentine-shaped. Main body 12 contains shaped end opening 14-A, shaped middle opening 16, and shaped end opening 14-B. Friction ridge 18 is placed upon either side of shaped middle opening 16, as well as on both sides, front and back, of main body 12. Attachment 20 is integrally connected to main body 12 at end point 22. Alternately, the attachment rope may be passed through hole 24 and then secured with a knot, or other such fastening mechanism. Dual-opening part 26 allows for the creation of end loop 28 at the end of attachment rope 20. End cap 30 finishes the end of attachment rope 20 and prevents the withdrawal of attachment 20 back through dual-opening part 26. Alternately or in conjunction with end cap 30, a simple loop knot may be tied into attachment cord 20 prior to end cap 30 in order to prevent the end of cord 20 from being pulled back through dual-opening part 26, which would undo end loop 28.

Main body 12 is inscribed with decorative logo 40 and decorative wording 42. main body 12 is inscribed with decorative logo 40 and decorative wording 42.

Figure 4:
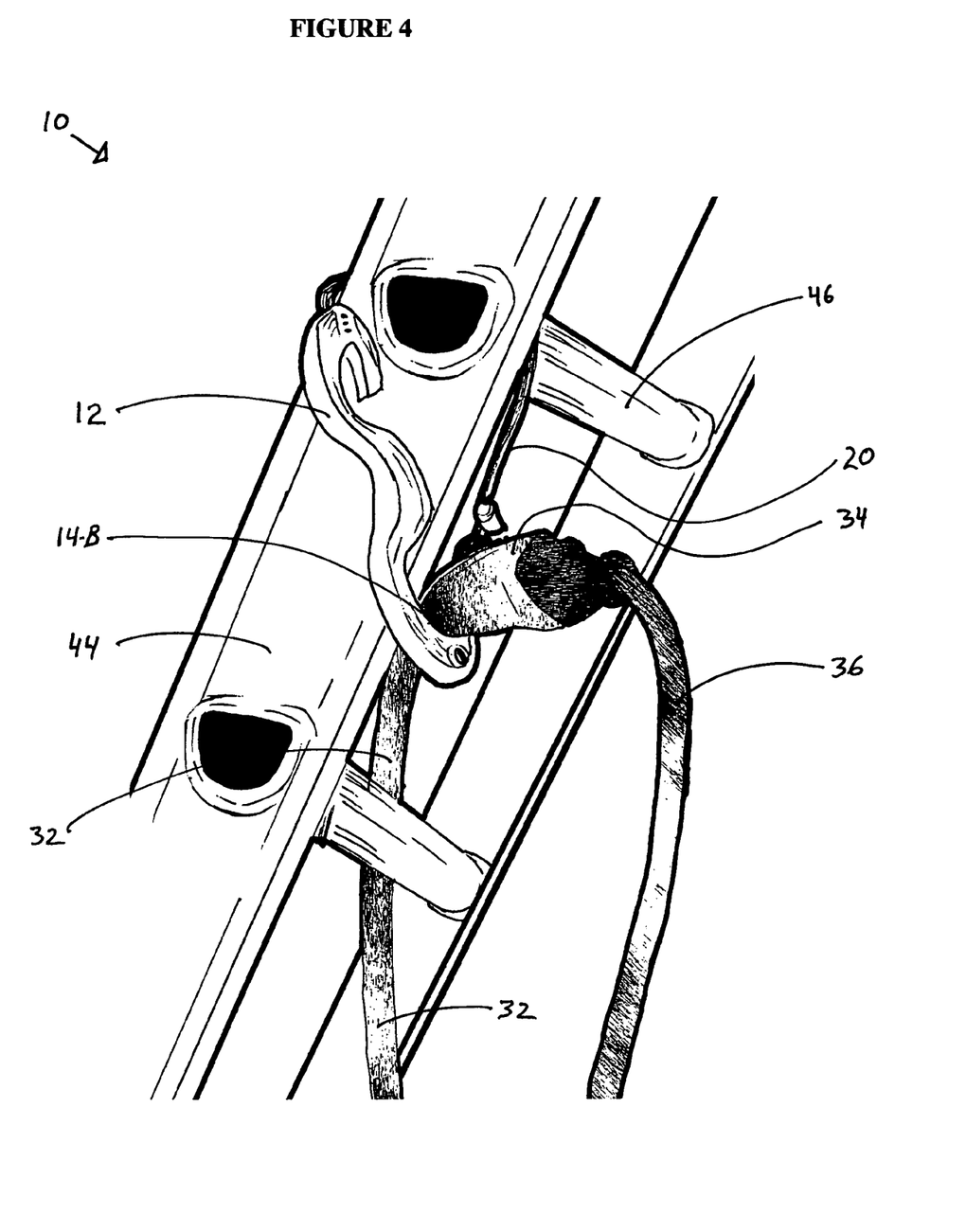
FIG. 4 is a perspective view of the invention in its use s a strain relief device on a ladder.

FIG. 4

FIG. 4 is a perspective view of power cord connection device 10 in its use on ladder 44 where it supports the weight of primary power cord 32. In this alternate use of the invention, attachment 20 is cinched down in place behind primary power cord plug 34 via end loop 28, as described previously. Attachment 20 is draped over ladder rung 46 while main body 12 is hanging down over the side of ladder 44. Shaped end opening 14-A is now at the lowest point of main body 12 and is hooked around primary power cord 32 behind primary power cord plug 34. The weight of primary power cord 32 is now effectively transferred to ladder 44 via power cord connection device 10.

Secondary power cord 36 may now be plugged into primary power cord 32 without the weight of primary power cord 32 either pulling apart the plug-to-plug connection or encumbering the use of a power tool that is plugged into primary power cord plug 34.

This makes working on the ladder with a power tool much easier.

Figure 5:
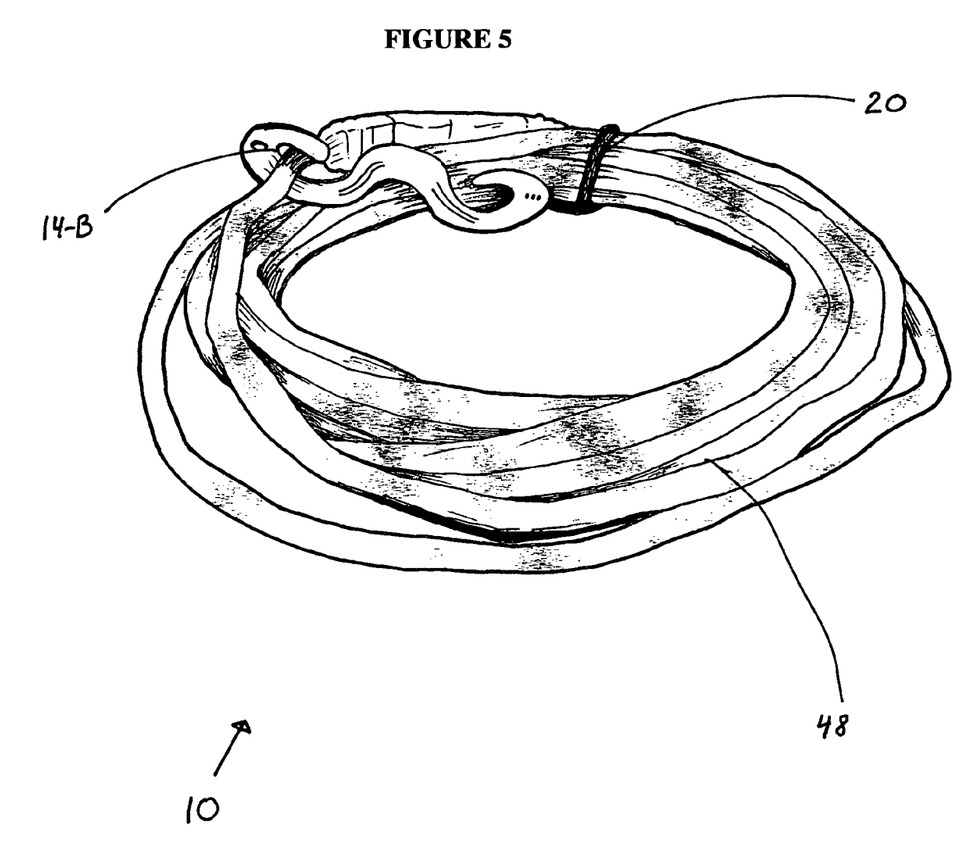
FIG. 5 is a perspective view of the invention in its use as a means of keeping an extension cord rolled up and organized.

FIG. 5

FIG. 5 is a perspective view of the invention in its alternate us as a means of keeping coiled extension power cord 48 rolled up and organized for storage. After rolling up coiled extension power cord 48, attachment 20 is tied around the coil. Shaped end opening 14B is then hooked over an accessible part of coiled extension power cord 48.

In the preferred embodiment shaped end opening 14B hooks over coiled extension power cord 48 behind the plug.

Figure 6:
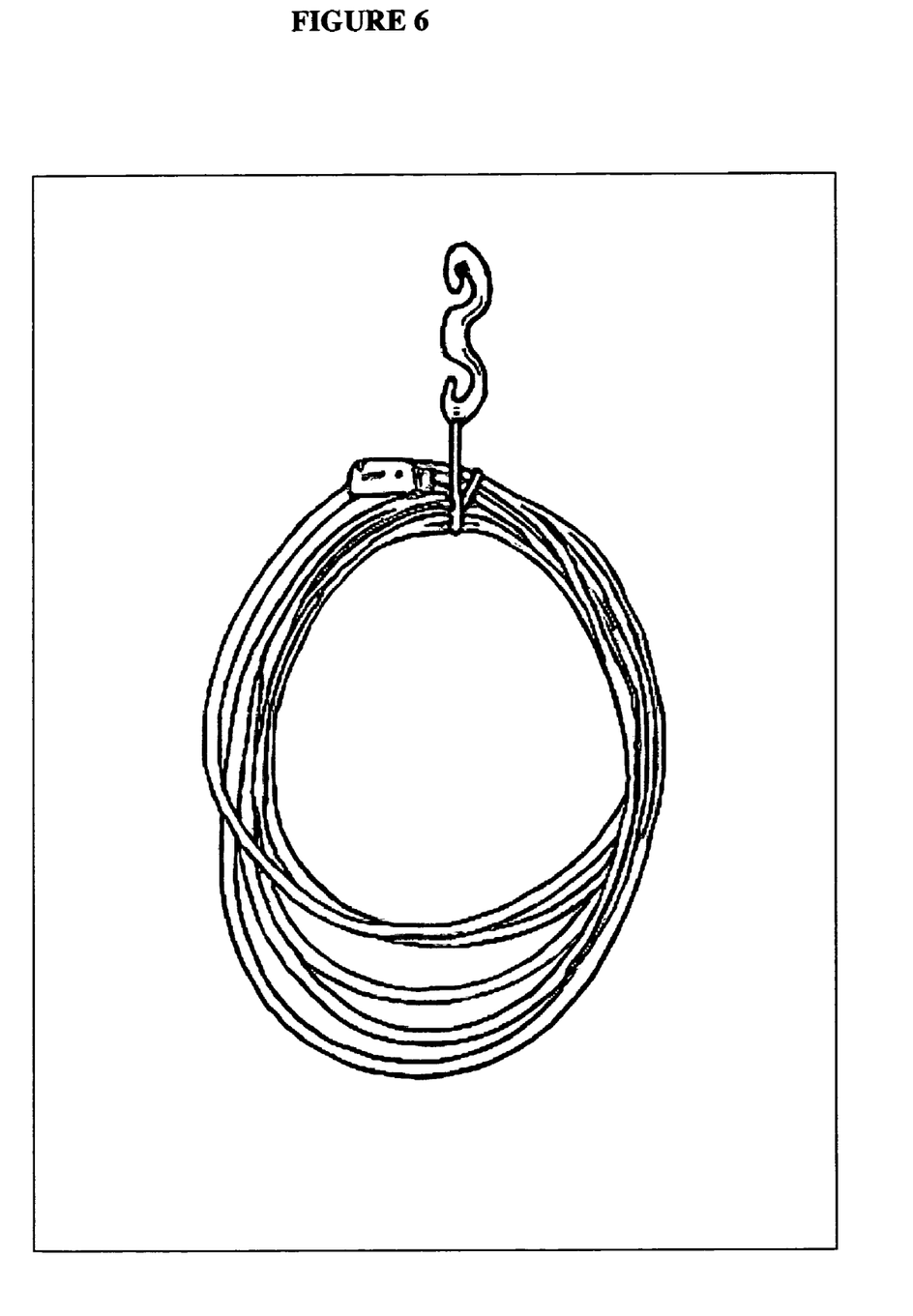
FIG. 6 is a front view of the invention in its use for keeping a power cord rolled up, organized and hung from a fastener, such as a hook or nail on a wall.

FIG. 6

FIG. 6 is a front view of power cord connection device 10 in its alternate use as a means of keeping coiled extension power cord 48 rolled up and organized. Coiled extension power cord 48 may be secured by attachment 20 in its coiled shape, as described before, and hung from fastener 50 on vertical surface 52 by shaped end opening 14B of main body 12.

CONCLUSIONS, RAMIFICATIONS, AND SCOPE

Accordingly, readers will see that the power cord connection device of this invention:

Can be easily mounted to a primary power cord.
Can be easily attached to a secondary power cord that has been plugged into the primary power cord, and thus reinforce the plug-to-plug connection between the two power cords.
Can keep a power tool connected to the extension power cord.
Can be connected and disconnected speedily.
Can work with a range of power cord sizes.
Can work with any size of plug that is fitted to the power cord.
Can be used to transfer the weight of the extension power cord to a ladder, thus making work with power tools on the ladder much easier.
Can be used to keep the extension power cord rolled up and organized for storage.
Can be used to keep the extension power cord rolled-up, organized, and suspended from a hook or fastener on a vertical surface, such as a wall.

While my above description contains many specificities, these should not be construed as limitations on the scope of the invention, but rather as an exemplification of one preferred embodiment thereof. Many other variations are possible. For example, the overall composition, size, and holding power of the main body may vary; its color may change, the decorative logo and text may be altered or removed, the number of shaped openings and friction ridges may be increased, the overall length of the attachment rope may vary, the shape, size and configuration of the shaped openings may vary, the attachment rope may be replaced by web strapping or other non-elastic rope-like material, the dual-opening part creating the loop in the attachment rope may be replaced by an adjustable buckle.

Accordingly, the scope of the invention should be determined by the appended claims and their legal equivalents, rather than by the examples given.

What is claimed is:

1. A power cord connection and strain-relief device, comprising:

a. a main flat serpentine-shaped body with three shaped openings that are sized to hold a standard 10-gauge through 18 gauge power cord,
   b. an attachment rope of predetermined length that actively functions as part of a overall strain relief mechanism,
   c. one end of said attachment rope being positively fixed to one end of said main body,
   d. the other end of said attachment rope having a looped means of attachment to a predetermined power cord,
   e. wherein the looped means of attachment affixes the device to said predetermined power cord and transmits the strain to and from this point of attachment to said fixed point of attachment at said main flat serpentine-shaped body, wherein said main flat serpentine-shaped body contains a set of two opposing friction ridges that are located around the central said half-round u-shaped middle opening, and on each face of the said main flat serpentine-shaped body.

2. The power cord and strain relief device of claim 1 wherein said main body has a flat serpentine shape with two opposing symmetrically shaped end openings and one half-round u-shaped middle opening.

3. The main body of claim 2 wherein said shaped opposing end openings have an angled hook shape allowing for the secure placement of said predetermined standard 10-gauge through 18 gauge power cord within said shaped end openings, while allowing the effortless release of said predetermined power cord from said placement.

4. The main body of claim 1 wherein the height of the said opposing friction ridges extends beyond the surface of the surrounding main body in order to increase the holding power of said standard 10-gauge through 18 gauge power cord within said main flat serpentine-shaped body.

5. A method of reinforcing the plug-to-plug connection between two power cords, comprising steps:

providing a flat serpentine shaped main body with two symmetrical shaped end sections and one half-round u-shaped middle section which are sized to house a standard 10-gauge through 18 gauge power cord within said shaped end openings, and symmetrical friction ridges placed to each side of said half-round u-shaped middle opening on each face of said main body, and one integrally connected attachment rope, providing an attachment rope with a looped end which is cinched down into place behind a plug end of primary power cord, thus affixing the device to said predetermined power cord, and which transmits a strain from fixed point of attachment at said flat serpentine-shaped main body,
   plugging a plug of secondary power cord into a plug of said primary power cord while making a wide loop between the end of said main body and said plug-to-plug connection while said attachment rope is direct and tautly under tension over the same distance,
   wherein said secondary power cord is looped through said shaped end openings and said shaped middle opening and traverses said friction ridges of said main body, Whereby strain force placed upon said secondary power cord is transferred to the said main body and then transferred to the said attachment rope and then transferred to the said primary power cord at the point of said loop behind said primary power cord plug.

* * * * *